United States Patent [19]

Noguchi et al.

[11] Patent Number: 5,687,471
[45] Date of Patent: Nov. 18, 1997

[54] METHOD OF AND APPARATUS FOR COVERING ROTOR MAGNETS

[75] Inventors: Hiroyuki Noguchi; Takeshi Mizuno; Kenji Morii; Tokio Kikuchi, all of Sayama, Japan

[73] Assignee: Honda Giken Kogyo Kabushiki Kaisha, Tokyo, Japan

[21] Appl. No.: 490,540

[22] Filed: Jun. 14, 1995

[30] Foreign Application Priority Data

Jun. 14, 1994 [JP] Japan .................................. 6-132090
Jun. 14, 1994 [JP] Japan .................................. 6-132091

[51] Int. Cl.$^6$ .................................................. H05K 15/02
[52] U.S. Cl. ............................... 29/598; 29/512; 29/736
[58] Field of Search ............................ 29/598, 512, 523, 29/895.213, 895.23, 736, 732, 243.518, 243.519, 243.524; 492/8; 72/58, 393, 432; 310/42, 153, 156

[56] References Cited

U.S. PATENT DOCUMENTS

| | | | |
|---|---|---|---|
| 3,397,439 | 8/1968 | Hanau | 492/8 X |
| 3,605,229 | 9/1971 | O'Neal et al. | 492/8 |
| 4,332,079 | 6/1982 | Silver | 29/598 |
| 4,617,726 | 10/1986 | Denk | 29/598 |
| 4,918,802 | 4/1990 | Schoefer | 29/736 X |
| 5,144,735 | 9/1992 | Stark | 29/732 |

FOREIGN PATENT DOCUMENTS

55-111645  8/1980  Japan .

*Primary Examiner*—Peter Vo
*Assistant Examiner*—Khan Nguyen
*Attorney, Agent, or Firm*—Birch, Stewart, Kolasch & Birch, LLP

[57] ABSTRACT

Permanent magnets disposed on the outer circumferential surface of a yoke are reliably and efficiently covered with a cylindrical member of fiber-reinforced resin. A covering apparatus has a holding jig for being forced into an insertion end of the cylindrical member and guiding a rotor when the rotor is inserted into the cylindrical member, and a movable jig for being forced with the holding jig into the cylindrical member, engaging a leading end of the rotor, and being inserted together with the rotor into the cylindrical member. The holding jig and the movable jig have teeth for forcibly expanding the cylindrical member radially outwardly to a diameter greater than the diameter of the rotor.

5 Claims, 13 Drawing Sheets

METHOD OF AND APPARATUS FOR COVERING ROTOR MAGNETS

BACKGROUND OF THE INVENTION

1. Field of the Invention

The present invention relates to a method of and an apparatus for covering permanent magnets with a cylindrical member to produce a rotor for an electric motor.

2. Description of the Related Art

Electric motors are generally composed of a stator core having as many windings as the number of given phases and a rotor having a plurality of permanent magnets mounted on its outer circumferential surface and rotatably disposed in the stator core. Specifically, the rotor usually has a rotatable shaft, a yoke mounted on the rotatable shaft, and a plurality of permanent magnets mounted on the outer circumferential surface of the yoke at angularly spaced intervals. The permanent magnets are covered with a cylindrical member of fiber-reinforced resin and pressed against the outer circumferential surface of the yoke by the cylindrical member.

To keep the permanent magnets pressed reliably against the outer circumferential surface of the yoke, it is necessary to strongly hold the cylindrical member in intimate contact with the permanent magnets. To meet such a requirement, the cylindrical member has a diameter considerably smaller than the diameter of the rotor. However, such a dimensional limitation makes it complex and time-consuming to mount the cylindrical member on the permanent magnets, i.e., to cover the permanent magnets with the cylindrical member.

As a solution to the above problem, there has been proposed an automatic magnet inserting apparatus as disclosed in Japanese laid-open patent publication No. 55-111645. The disclosed automatic magnet inserting apparatus comprises means for transferring an array of unmagnetized magnets into a magnetizing position, means for magnetizing the transferred unmagnetized magnets into a given condition, means for converting the magnetized magnets into a cylindrical array, and means for simultaneously inserting the cylindrical array of magnetized magnets axially with respect to their cylindrical shape into a rotor case.

According to the above conventional arrangement, the magnets are simultaneously inserted into the rotor case with a jig and bonded thereto by an adhesive. To keep the magnets in intimate contact with the outer circumferential surface of a yoke, the yoke has to be press-fitted into the magnets that have been fixedly installed in the rotor case. Consequently, it is highly cumbersome to press-fit the yoke into the cylindrical array of magnetized magnets in the rotor case.

SUMMARY OF THE INVENTION

It is an object of the present invention to provide a method of and an apparatus for covering a plurality of magnets disposed on an outer circumferential surface of a rotor reliably and efficiently with a cylindrical member.

Another object of the present invention is to provide a method of and an apparatus for covering permanent magnets smoothly with a cylindrical member in a manner to produce a high-quality rotor.

Still another object of the present invention is to provide a method of and an apparatus for covering permanent magnets with a cylindrical member through a simple and quick process for increased productivity.

According to the present invention, there is provided a method of covering permanent magnets of a rotor which are angularly spaced at given angular intervals, with a cylindrical member, comprising the steps of forcing a holding jig and a movable jig into an insertion end of the cylindrical member to expand the insertion end radially outwardly to a diameter greater than the diameter of the rotor, inserting the rotor together with the movable jig into the cylindrical member while being guided by the holding member, with the rotor having a leading end engaging the movable jig, and after the rotor has been inserted in the cylindrical member, removing the holding jig and the movable jig from opposite ends of the rotor, for thereby leaving the permanent magnets covered with the cylindrical member.

According to the present invention, there is provided an apparatus for covering permanent magnets of a rotor which are angularly spaced at given angular intervals, with a cylindrical member, comprising a holding jig for being forced into an insertion end of the cylindrical member and guiding the rotor when the rotor is inserted into the cylindrical member, and a movable jig for being forced with the holding jig into the insertion end of the cylindrical member, engaging a leading end of the rotor, and being inserted together with the rotor into the cylindrical member, the holding jig having a plurality of grooves for insertion therein of the permanent magnets and a plurality of first teeth disposed between the grooves for expanding the cylindrical member to a diameter greater than the diameter of the rotor, the movable jig having a plurality of first teeth for placing thereon the permanent magnets which are inserted in the grooves and expanding the cylindrical member radially outwardly to a diameter greater than the diameter of the rotor, the second teeth having respective tapered surfaces progressively smaller in diameter toward a leading end to be inserted into the cylindrical member.

According to the present invention, there is further provided a method of covering permanent magnets of a rotor which are angularly spaced at given angular intervals, with a cylindrical member, comprising the steps of placing the cylindrical member with a gap defined between the cylindrical member and an inner circumferential surface of a first casing, coupling a second casing to the first casing in a fluid-tight manner with the rotor being disposed between the second casing and the first casing, while the first casing and the second casing are being coupled in a fluid-tight manner, pressing the cylindrical member against the inner circumferential surface of the first casing under a fluid pressure to expand the cylindrical member radially outwardly, inserting the rotor into the cylindrical member which has been expanded radially outwardly, and discharging the fluid pressure to allow the cylindrical member to be contracted radially inwardly, thereby covering the permanent magnets with the cylindrical member.

According to the present invention, there is also provided an apparatus for covering permanent magnets of a rotor which are angularly spaced at given angular intervals, with a cylindrical member, comprising a first casing for placing the cylindrical member inserted therein, the first casing having an inner circumferential surface spaced a gap from an outer circumferential surface of the cylindrical member placed therein, a second casing movable relatively to the first casing, clamp means for coupling the first casing and the second casing to each other in a fluid-tight manner with the cylindrical member and the rotor being disposed between the first casing and the second casing, fluid supply means for supplying a fluid pressure to press the cylindrical member against the inner circumferential surface of the first casing thereby to expand the cylindrical member radially outwardly, and inserting means for inserting the rotor into the cylindrical member which has been expanded radially outwardly.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
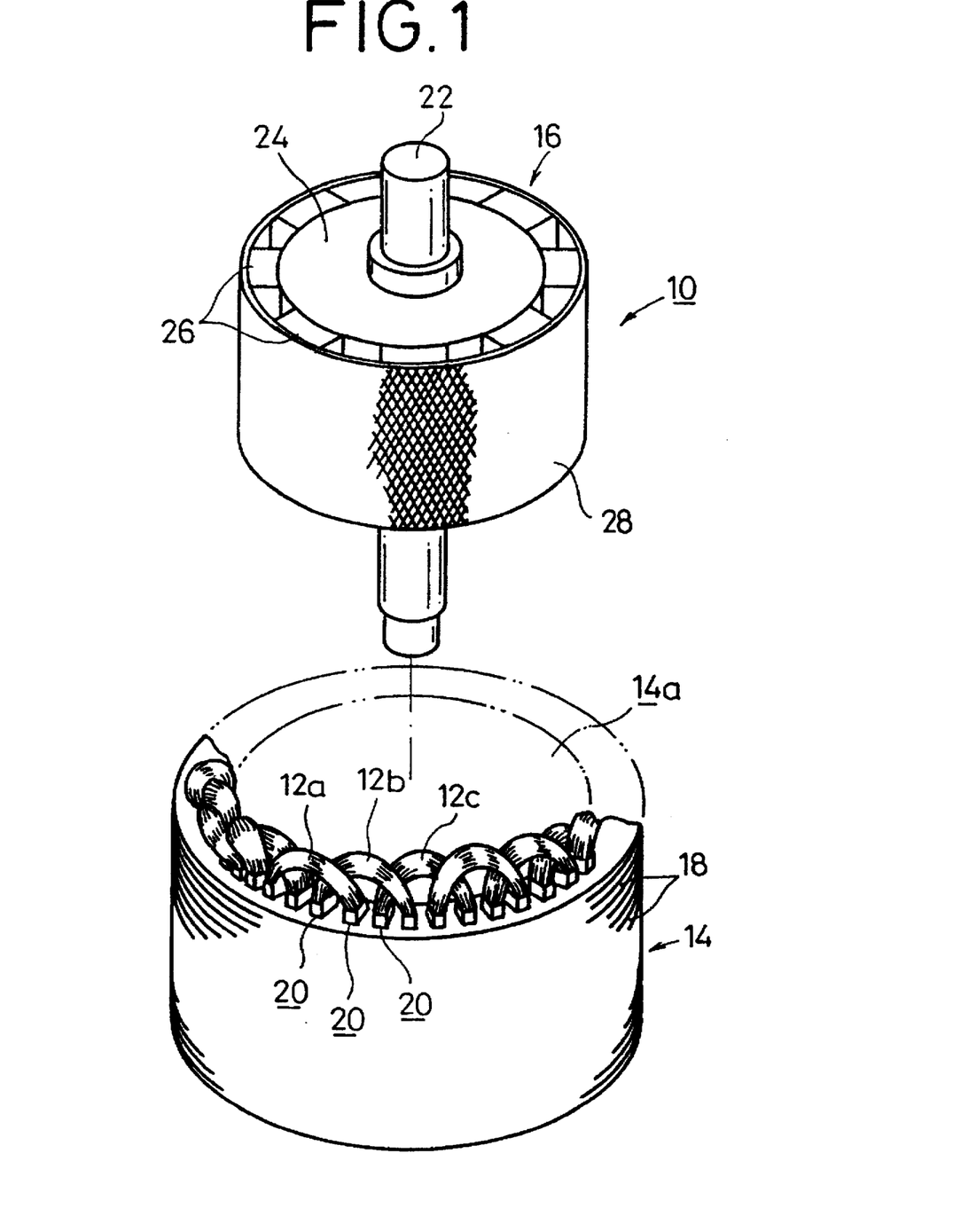
FIG. 1 is an exploded perspective view of an electric motor which incorporates a rotor with permanent magnets covered according to a covering apparatus according to the present invention.

As shown in FIG. 1, an electric motor 10 comprises a stator core 14 with three-phase windings 12a, 12b, 12c mounted therein, and a rotor 16 rotatably disposed in a hollow space 14a in the stator core 14.

The stator core 14 comprises a plurality of laminated steel sheets 18 bonded together, and has a plurality of axial parallel slots 20 defined in an inner circumferential surface thereof at angularly spaced intervals.

The rotor 16 comprises a rotatable shaft 22, a yoke 24 mounted on the shaft 22, and a plurality of permanent magnets 26 bonded to an outer circumferential surface 24a of the yoke 24 at angularly spaced intervals. A cylindrical member 28 is installed on the rotor 16 in covering relation to the permanent magnets 26 by a covering apparatus (described later on) according to the present invention. The cylindrical member 28 is made of fiber-reinforced resin which is a nonmagnetic material.

Figure 2:
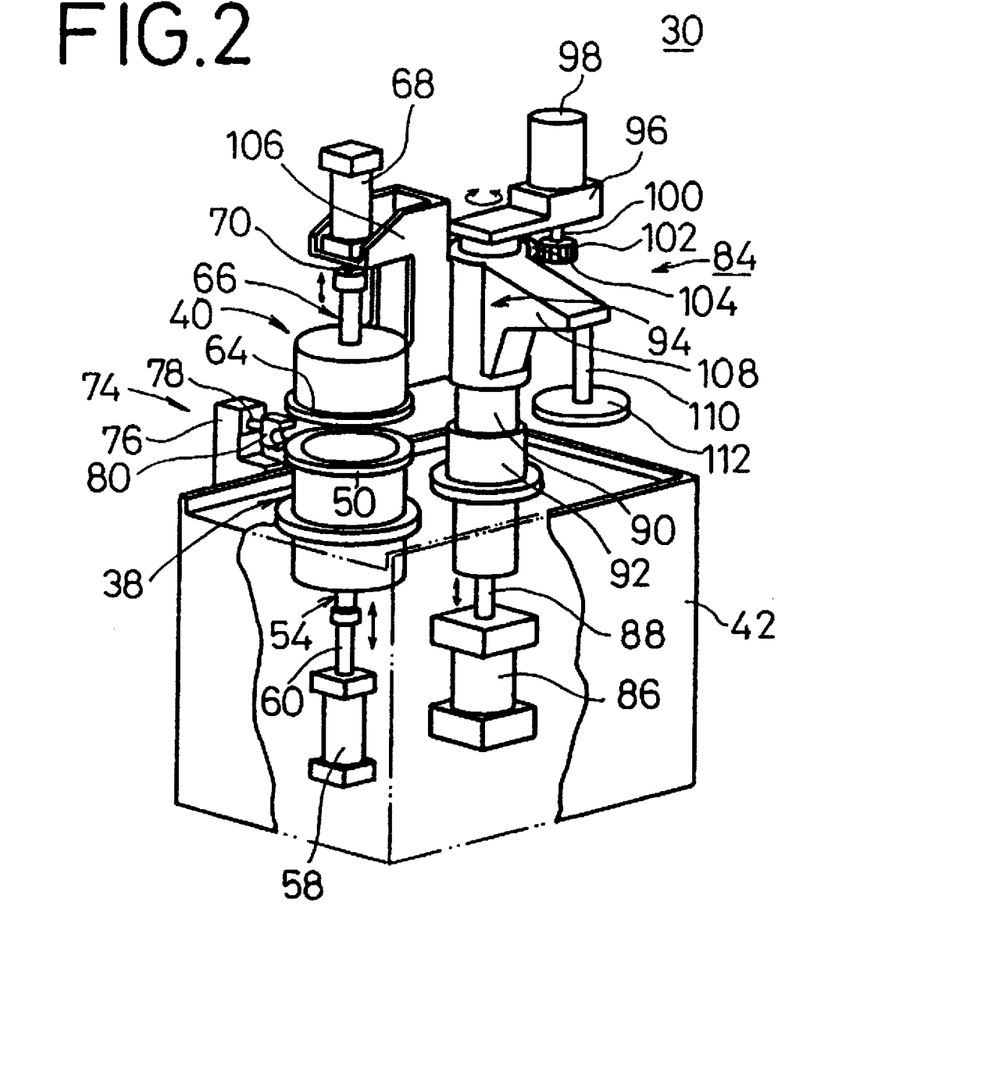
FIG. 2 is a perspective view of a covering apparatus according to a first embodiment of the present invention.
Figure 3:
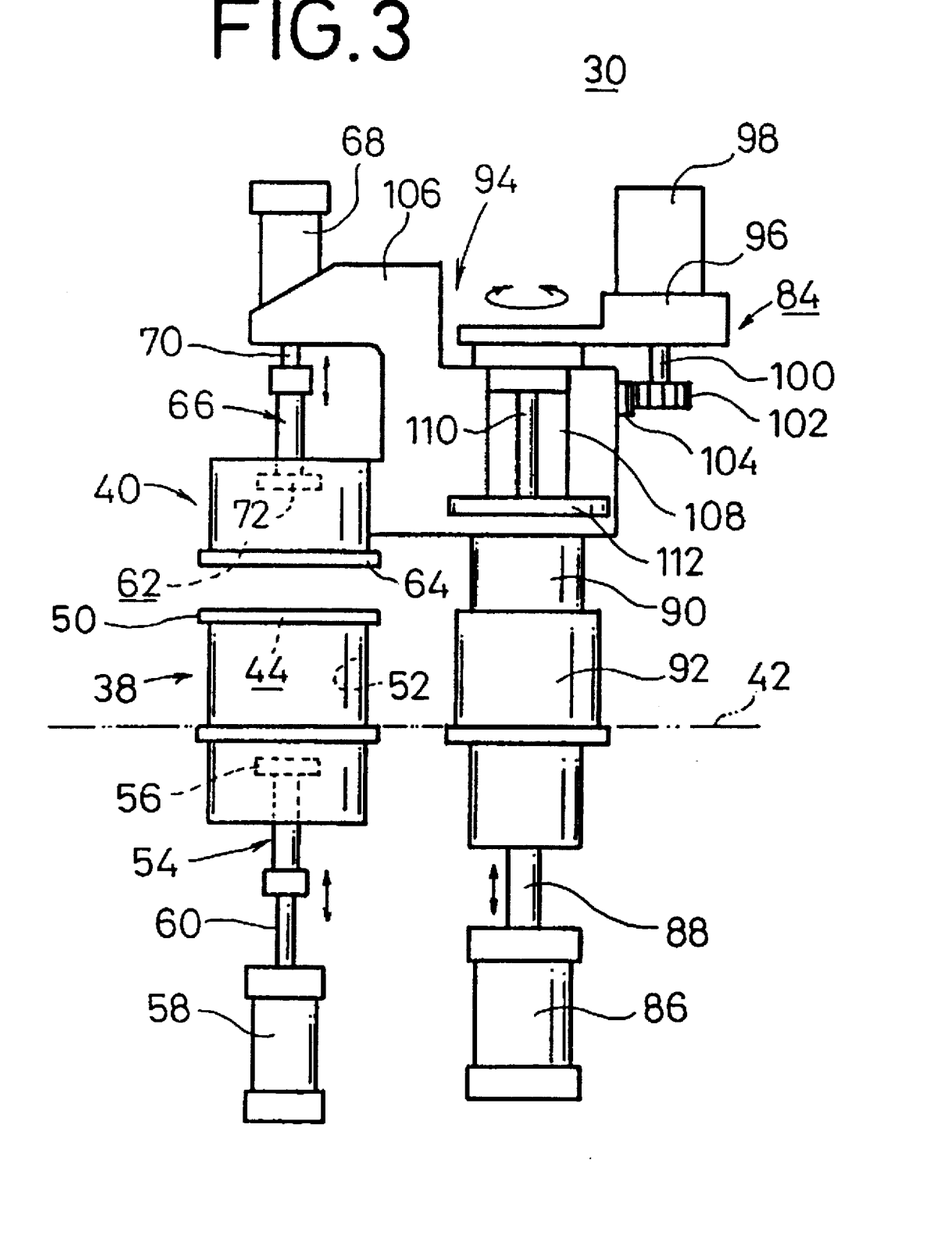
FIG. 3 is a front elevational view of the covering apparatus shown in FIG. 2.
Figure 4:
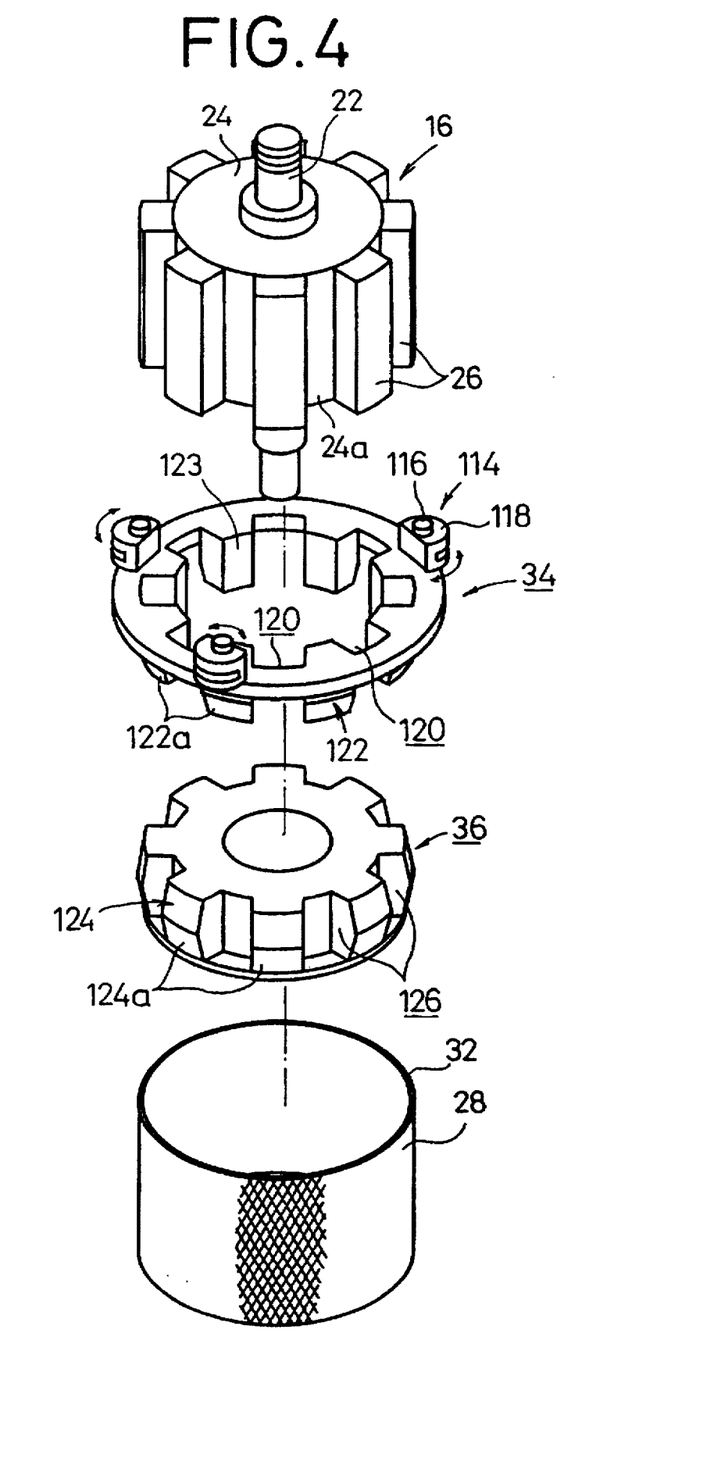
FIG. 4 is an exploded perspective view of a holding jig and a movable jig of the covering apparatus shown in FIG. 2.

FIGS. 2 and 3 show a covering apparatus 30 according to a first embodiment of the present invention. As shown in FIG. 4, the covering apparatus 30 comprises a holding jig 34 for being press-fitted into an insertion end 32 of the cylindrical member 28 to guide the rotor 16 into the cylindrical member 28, and a movable jig 36 for being press-fitted, together with the holding jig 34, into the insertion end 32 of the cylindrical member 28 and engaging a leading insertion end of the rotor 16 for insertion, together with the rotor 16, into the cylindrical member 28. The holding jig 34 and the movable jig 36 are disposed in a first casing 38 and a second casing 40 which are of a cylindrical shape.

The first casing 38, which is supported on a base 42, is of a substantially bottomed cylindrical shape with an opening 44 defined in its upper end. The first casing 38 has an annular ridge 46 (see FIG. 5) projecting upwardly around the opening 44. The ridge 46 has a relief groove 48 defined fully in its inner circumferential surface. The first casing 38 also has a radially outwardly projecting engaging flange 50 around the lower end of the ridge 46, and a radially inwardly projecting support ledge 51 around the lower end of the ridge 46. The first casing 38 has an inner circumferential surface 52 spaced a gap H from the outer circumferential surface of the cylindrical member 28 that is placed in the first casing 38. A lower setting member 54 is vertically slidably disposed in the first casing 38. The lower setting member 54 is of a substantially cylindrical shape and has a larger-diameter flange 56 on its upper end. The lower end of the lower setting member 54 is coupled to a rod 60 which extends upwardly from a push-up cylinder 58.

The second casing 40 is supported on a turning unit (described later on), and is in the form of a substantially bottomed cylindrical shape with an opening 62 defined in its lower end. The second casing 40 has a radially outwardly projecting engaging flange 64 (see FIG. 7) on its lower end. An upper setting member 66 is vertically slidably disposed in the upper end of the second casing 40. The upper setting member 66 is coupled to a rod 70 which extends downwardly from a pressing cylinder 68 which is mounted on the turning unit. The upper setting member 66 has a larger-diameter flange 72 on its lower end which engages the upper end of the second casing 40 thereby to hold the second casing 40.

Figure 8:
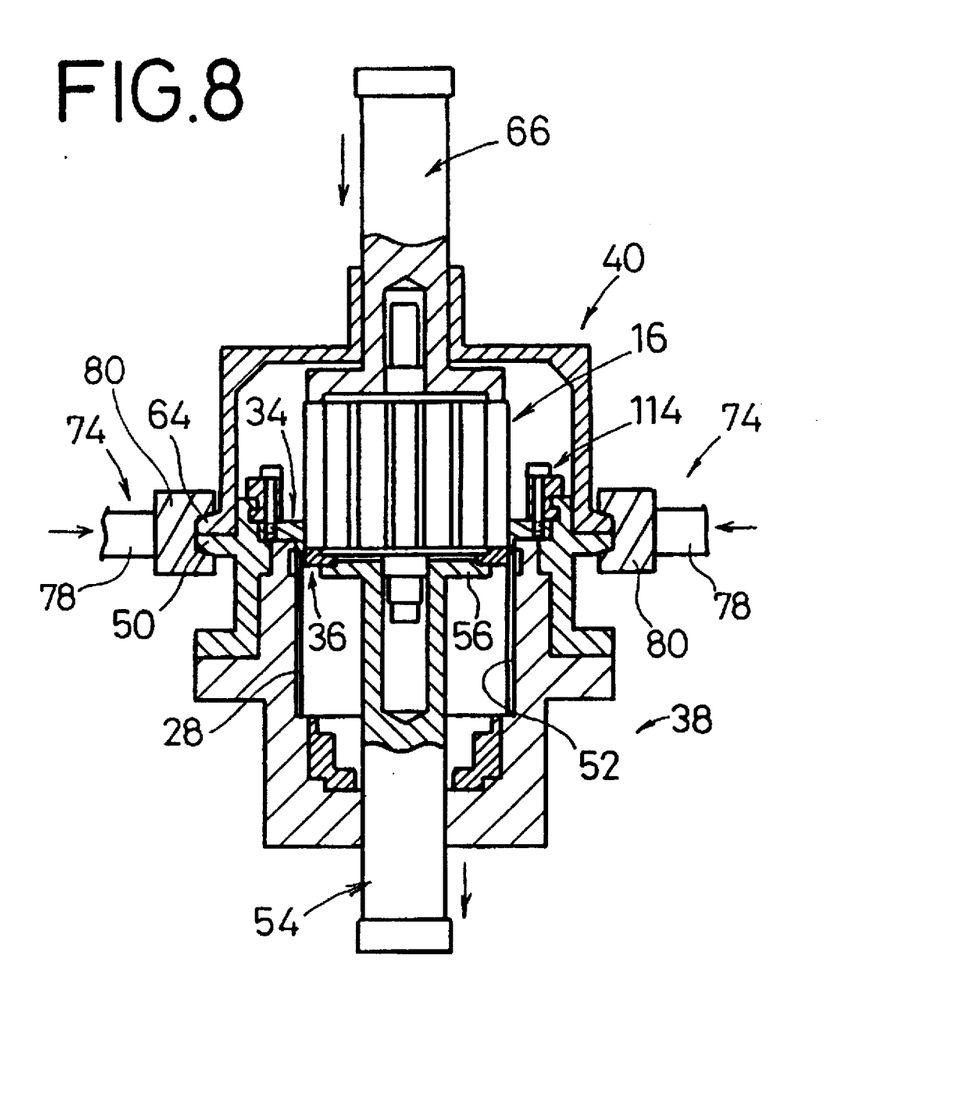
FIG. 8 is a vertical cross-sectional view showing the first casing with a second casing coupled thereto.

The base 42 has a clamp means 74 for coupling the first casing 38 and the second casing 40 with the cylindrical member 28, the holding jig 34, the movable jig 36, and the rotor 16 accommodated therein. As shown in FIG. 8, the clamp means 74 comprises a plurality of clamps (only one shown in FIG. 1) disposed around the circumferential edges of the first casing 38 and the second casing 40. Each of the clamps has a cylinder 76 having a rod 78 extending radially inwardly toward the center of the first casing 38 and coupled to a clamp member 80. The clamp member 80 grips the flange 50 of the first casing 38 and the flange 64 of the second casing 40 together for thereby securely holding the first casing 38 and the second casing 40.

As shown in FIGS. 2 and 3, a feed means 84 has a vertical cylinder 86 having an upwardly extending rod 88 coupled to a guide rod 90 which is vertically guided by a guide sleeve 92 fixedly mounted on the base 42. A turning unit 94 is angularly movably mounted on the guide rod 90. A turning motor 98 is fixed to the upper end of the guide rod 90 by an attachment 96. The turning motor 98 has a downwardly projecting rotatable shaft 100 to which there is fixed a first gear 102 held in mesh with a large-diameter gear 104 of the turning unit 94.

The turning unit 94 has a first attachment 106 and a second attachment 108 that are angularly spaced from each other. The pressing cylinder 68 which is oriented downwardly is fixedly mounted on the first attachment 106. The second attachment 108 has a downwardly extending support rod 110 having a large-diameter flange 112 on its lower end for releasably supporting the holding jig 34 and the movable jig 36.

As shown in FIG. 4, the holding jig 34 is in the form of a substantially circular plate with a fixing means 114 mounted on its outer circumferential edge. The fixing means 114 comprises a plurality of pins 116 fixed to the holding jig 34 at angularly spaced positions and a plurality of engaging members 118 rotatably mounted on the respective pins 116. Each of the engaging members 118 is of a semicircular shape.

The holding jig 34 has a plurality of grooves 120 defined in its inner circumferential edge for alignment with and insertion therein of the permanent magnets 26 of the rotor 16, and a plurality of teeth 122 on its lower end which are separated by the grooves 120. The teeth 122 jointly have a diameter preset for expanding the cylindrical member 28 radially outwardly into a diameter greater than the diameter of the rotor 16, the teeth 122 having respective tapered surfaces 122a which are progressively smaller in diameter in the downward direction, i.e., toward a leading end of the holding jig 34 to be inserted into the cylindrical member 28. The teeth 122 have respective inner protrusions 123 projecting radially inwardly toward the center of the holding jig 34 for sliding engagement with the outer circumferential surface 24a of the yoke 24.

The movable jig 36 is in the form of a substantially circular plate, and has a plurality of teeth 124 on its outer circumferential surface for alignment with the permanent magnets 26 of the rotor 16, with recesses 126 defined between the teeth 124 for receiving the respective teeth 122 of the holding jig 34 so that the movable jig 36 can be held by the holding jig 34. As with the teeth 122, the teeth 124 jointly have a diameter preset for expanding the cylindrical member 28 radially outwardly into a diameter greater than the diameter of the rotor 16, the teeth 124 having respective tapered surfaces 124a which are progressively smaller in diameter in the downward direction, i.e., toward a leading end of the movable jig 36 to be inserted into the cylindrical member 28. Practically, the diameter of the teeth 122 is slightly greater than the diameter of the teeth 124.

Operation of the covering apparatus 10 for carrying out a covering method according to the first embodiment will be described below.

Figure 5:
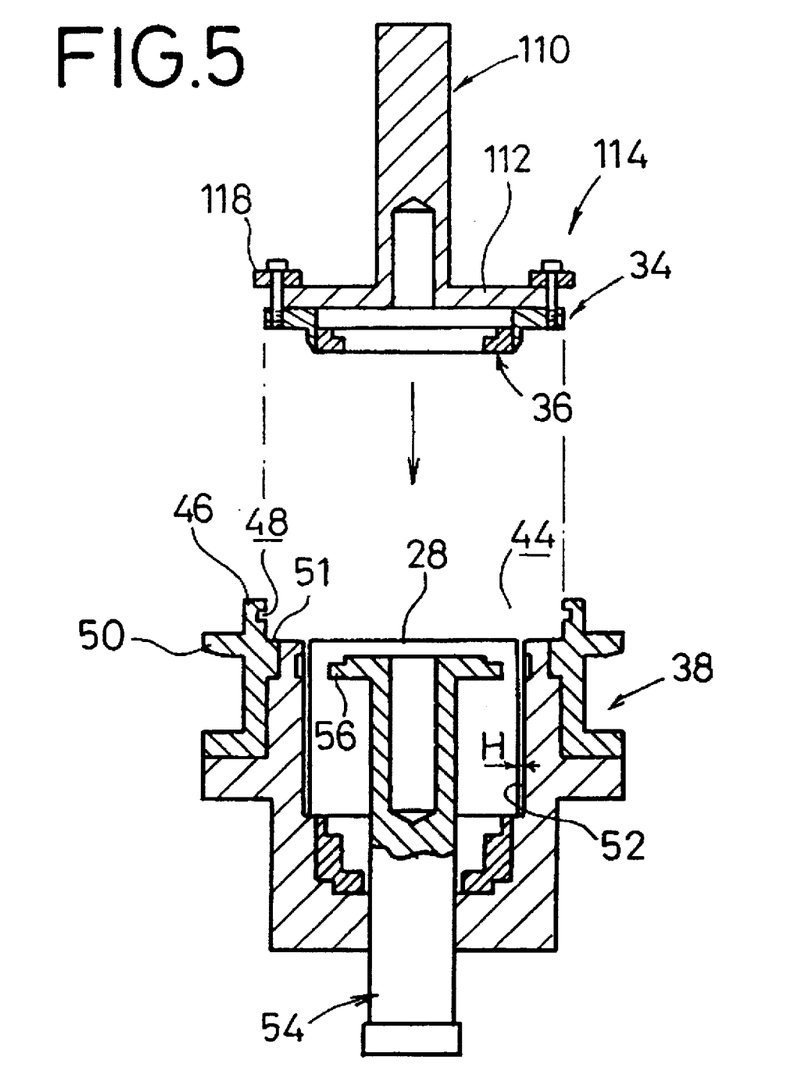
FIG. 5 is a vertical cross-sectional view showing a first casing and a cylindrical member disposed therein.

As shown in FIG. 5, with the lower setting member 54 lifted, the cylindrical member 28 is placed in the first casing 38 leaving the gap H between the outer circumferential surface of the cylindrical member 28 and the inner circumferential surface 52 of the first casing 38. Thereafter, the holding jig 34 and the moving jig 36 are fed together by the feed means 84. At this time, the engaging members 118 of the holding jig 34 are supported by the flange 112 of the support rod 110, and the teeth 122 of the holding jig 34 are fitted in the respective recesses 126 of the movable jig 36, which is held by the holding jig 34 under frictional forces developed between the teeth 122 and the surfaces of the recesses 126.

When the turning motor 98 is energized, the turning unit 94 is turned a given angle thereby through the first and second gears 102, 104 until the support rod 110 is aligned coaxially with the first casing 38. Then, the vertical cylinder 86 is actuated to lower the guide rod 90 with the rod 88. The teeth 122, 124 of the holding jig 34 and the movable jig 36 which are supported on the support rod 110 are inserted into the insertion end 32 of the cylindrical member 28, which is now forcibly spread or expanded radially outwardly (see FIG. 6).

Figure 6:
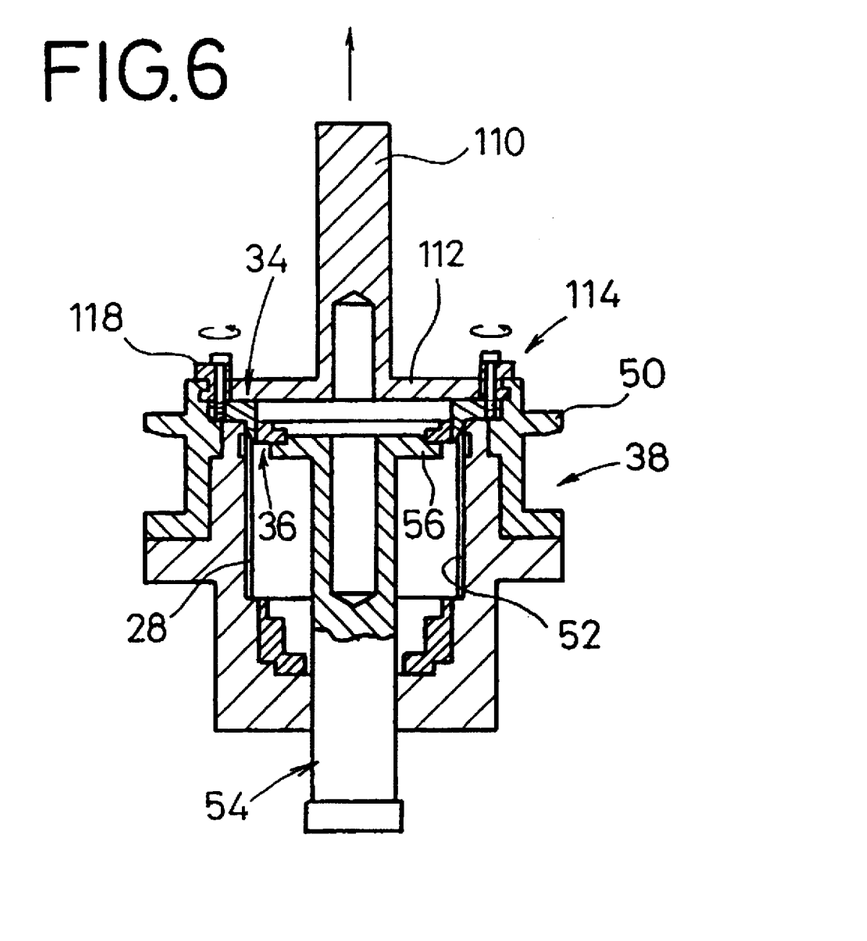
FIG. 6 is a vertical cross-sectional view showing the first casing with the holding jig and the moving jig disposed therein.

The engaging members 118 are turned out of engagement with the flange 112 of the support rod 110 and into engagement with the annular ridge 46 of the first casing 38. The holding jig 34 is now held by the first casing 38, and the movable jig 36 is laced on the flange 56 of the lower setting member 54. When the vertical cylinder 86 is actuated, only the support rod 110 is elevated.

Figure 7:
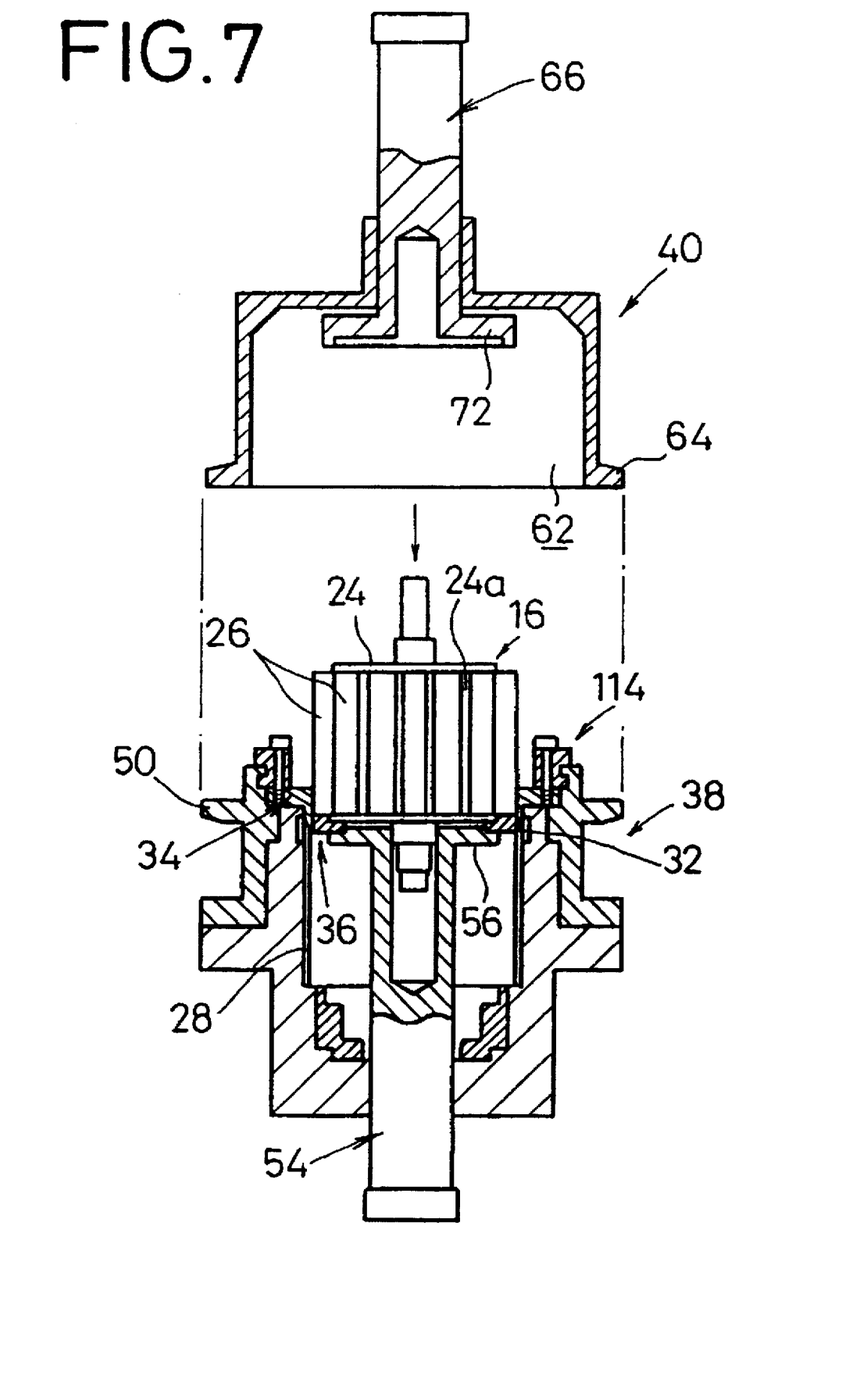
FIG. 7 is a vertical cross-sectional view showing the first casing with a rotor disposed thereon.

As shown in FIG. 7, the rotor 16 with the permanent magnets 26 bonded to the outer circumferential surface 24a of the yoke 24 is placed on the first casing 38 with the permanent magnets 26 aligned with the respective teeth 124 of the movable jig 36. Thereafter, the second casing 40 is brought into a position above the first casing 38 by the turning motor 98, and then lowered into engagement with the first casing 38 by the vertical cylinder 86. The flange 50 of the first casing 38 and the flange 64 of the second casing 40 are held in abutment against each other. While the pressing cylinder 68, which constitutes part of the clamp means 80, is being actuated downwardly, the clamp members 80 grip the flanges 50, 64 together. The first casing 38 and the second casing 40 are now coupled to each other (see FIG. 8).

While the pressing cylinder 68 is being further actuated downwardly, the push-up cylinder 58 is actuated downwardly or inactivated. Therefore, the upper setting member 66 coupled to the rod 70 presses the rotor 16 downwardly. The rotor 16 placed on the movable jig 36 is lowered therewith into the cylindrical member 28.

Figure 9:
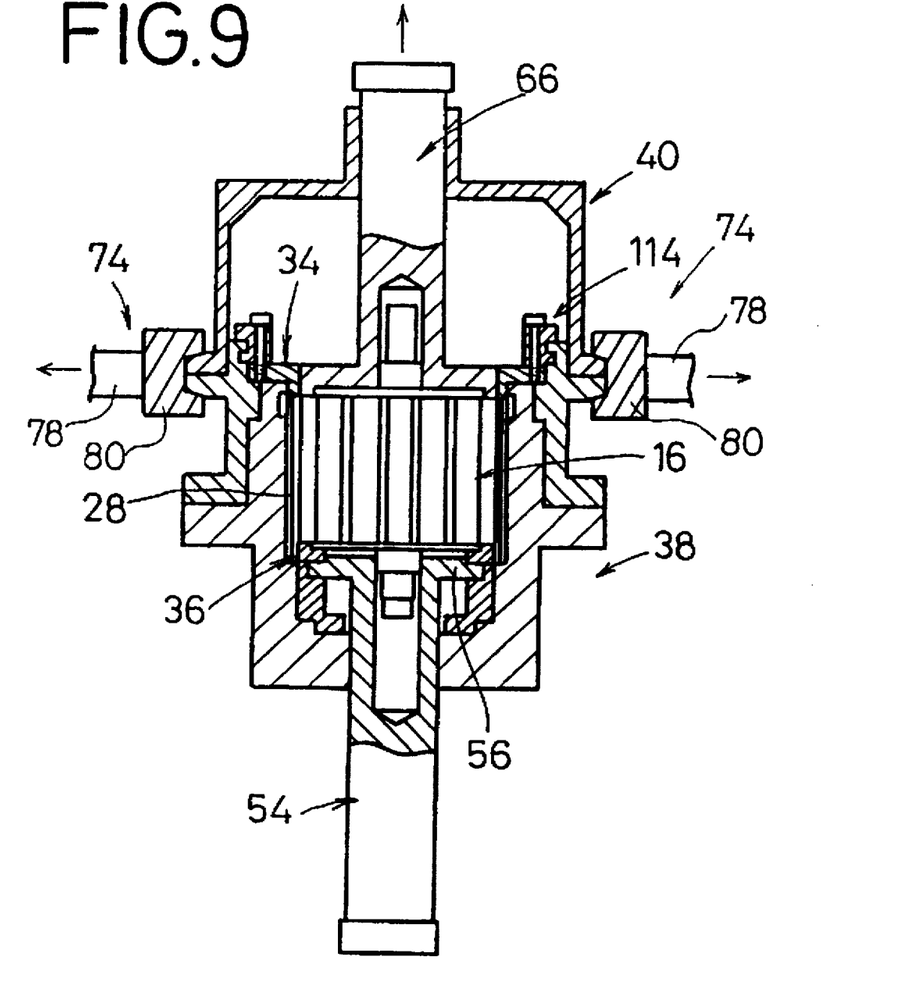
FIG. 9 is a vertical cross-sectional view showing the parts after the rotor has been press-fitted.

As shown in FIG. 9, after the rotor 16 has been inserted in the cylindrical member 28, the clamp members 80 of the clamp means 74 are moved out of engagement with the first and second casings 38, 40, and the second casing 40 is lifted by the vertical cylinder 86.

Figure 10:
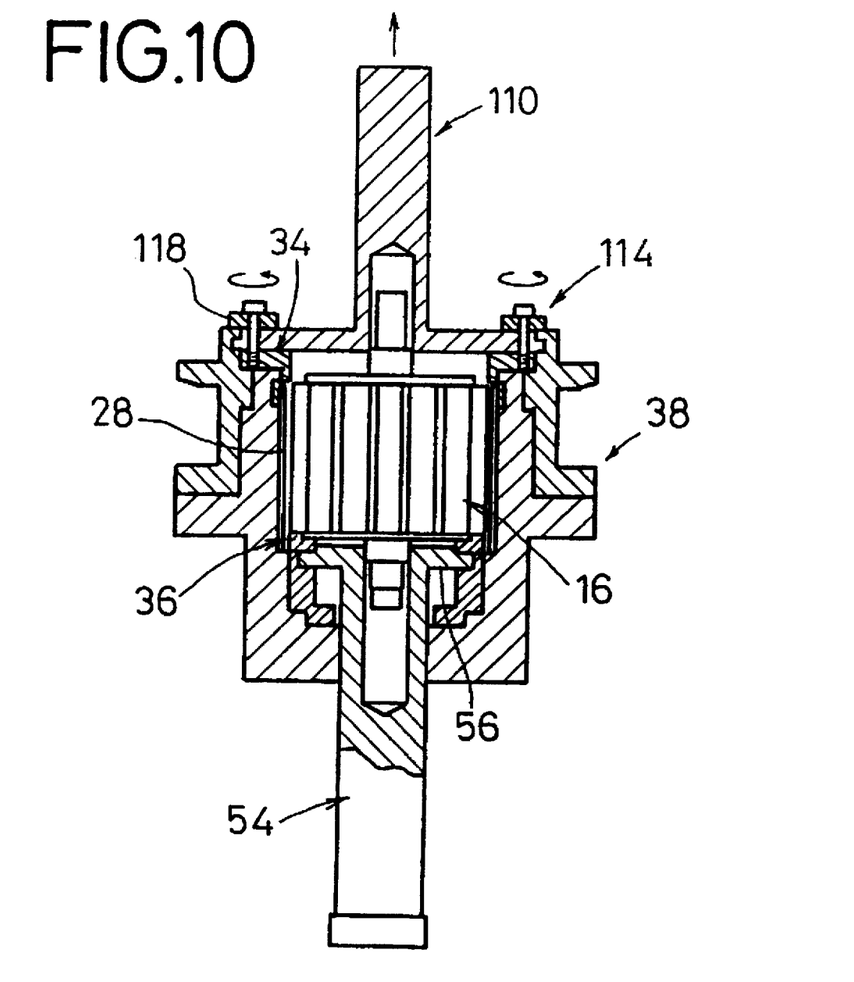
FIG. 10 is a vertical cross-sectional view showing the manner in which the holding jig is released from the first casing.
Figure 11:
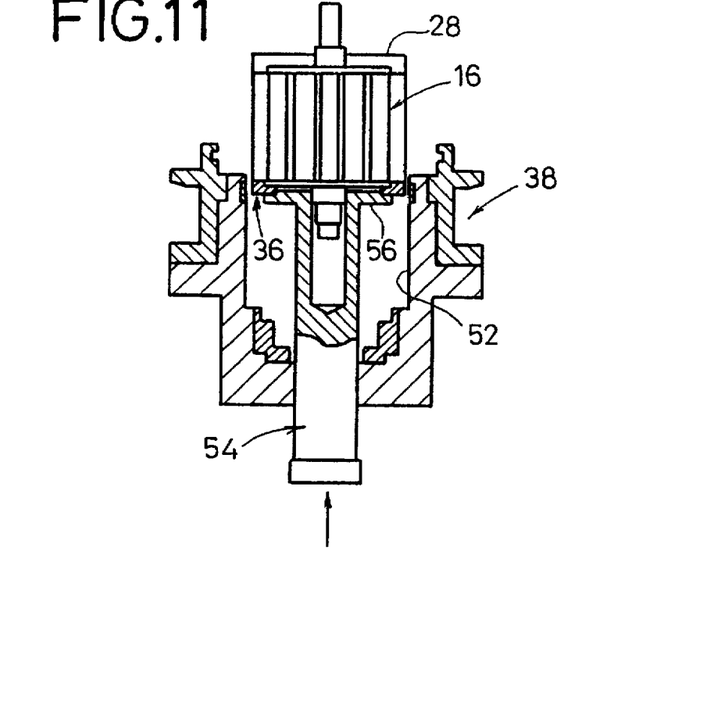
FIG. 11 is a vertical cross-sectional view showing the manner in which the covered rotor is removed from the first casing.

Then, as shown in FIG. 10, the support rod 110 is positioned on the first casing 38, and the engaging members 118 are turned to hold the holding jig 34 on the support rod 110. After the support rod 110 is lifted together with the holding jig 34 away from the first casing 38, the push-up cylinder 58 is actuated to elevate the lower setting member 54 with the rotor 16 (see FIG. 11) until the rotor 16 is removed from the first casing 38.

Figure 12:
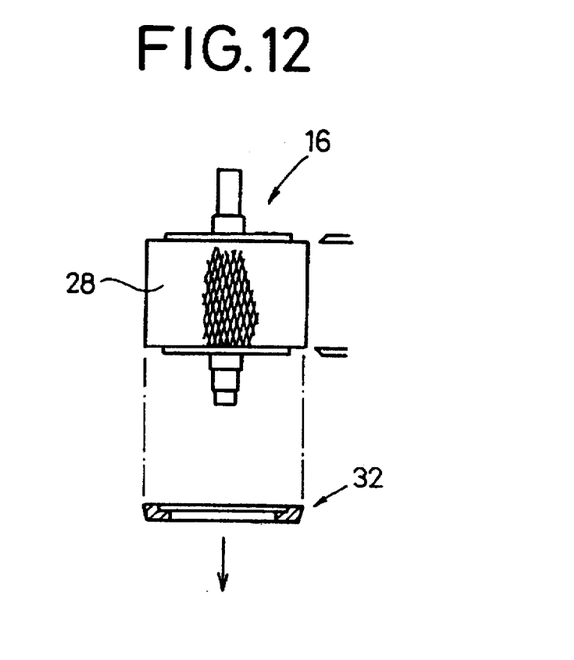
FIG. 12 is an elevational view showing the manner in which excessive cylindrical member portions are severed from the covered rotor.

As shown in FIG. 12, excessive end portions of the cylindrical member 28 which project axially outwardly from the opposite ends of the rotor 16 are severed off, and the movable jig 36 is detached from the rotor 16. The process of covering the permanent magnet 26 of the rotor 16 with the cylindrical member 28 is now finished.

In the first embodiment, as described above, the cylindrical member 28 is first placed in the first casing 38, and then the holding jig 34 and the movable jig 36 are press-fitted into the insertion end 32 of the cylindrical member 28 to forcibly spread or expand the insertion end 32 radially outwardly to a diameter greater than the diameter of the rotor 16. Thereafter, the rotor 16 is inserted together with the movable jig 36 into the cylindrical member 28 by being guided by the holding jig 34, and the inner protrusions 123 of the holding jig 34 are held in sliding engagement with the outer circumferential surface 24a of the yoke 24 to prevent the holding member 34, i.e., the cylindrical member 28, from being contracted radially inwardly or reduced in diameter.

Accordingly, the rotor 16 can easily and smoothly be inserted into the cylindrical member 28 which is normally considerably smaller in diameter than the rotor 16. The cylindrical member 28 can be installed on the permanent magnets 26, i.e., the permanent magnets 26 can be covered with the cylindrical member 28, efficiently to achieve a high-quality arrangement of the rotor 16.

Since the rotor 16 with the permanent magnets 26 mounted on the yoke 24 is inserted into the cylindrical member 28, the process is much simpler and more efficient for higher productivity than would be if the permanent magnets 26 were inserted one by one between the yoke 24 and the cylindrical member 28.

Figure 13:
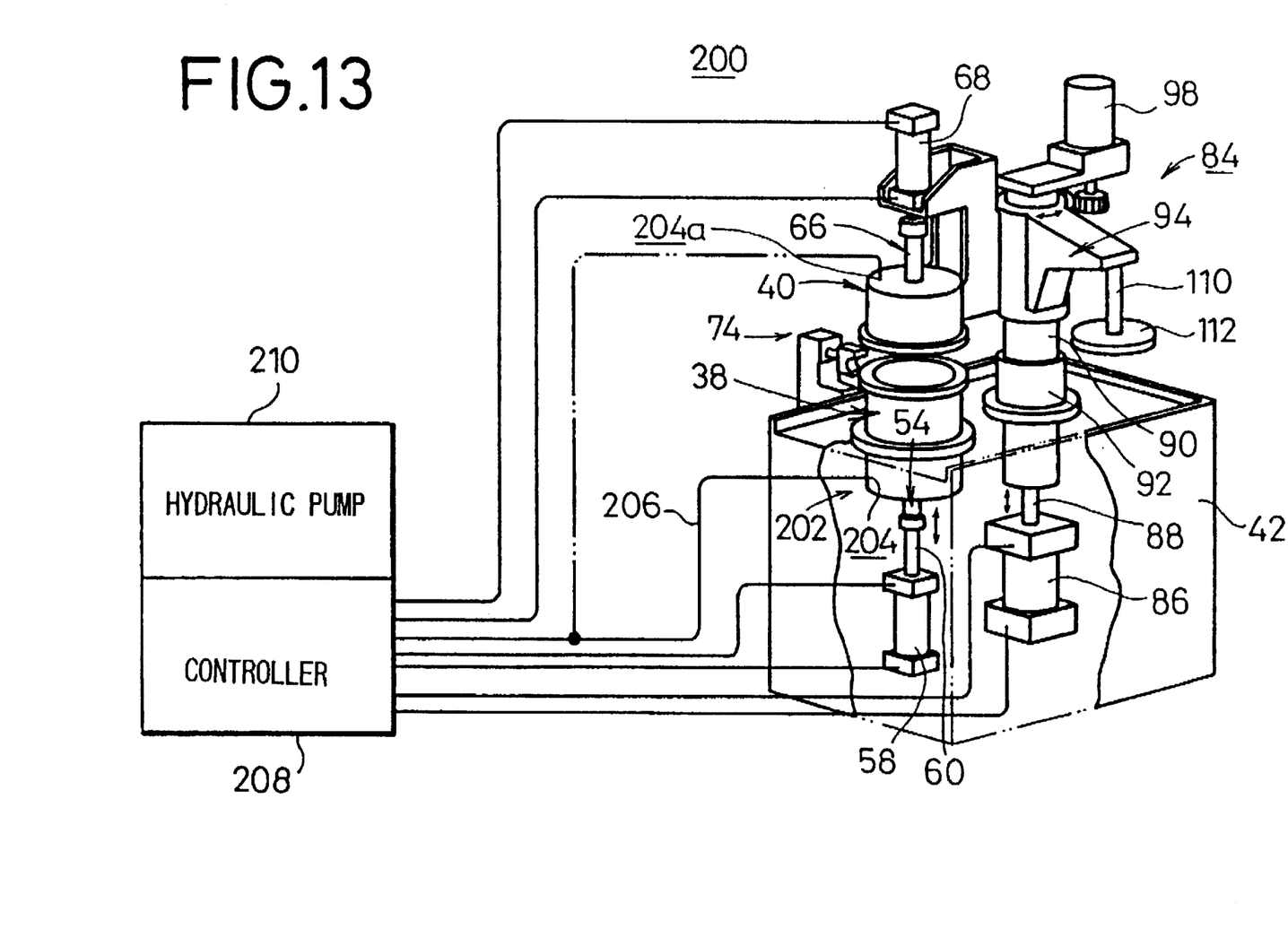
FIG. 13 is a perspective view of a covering apparatus according to a second embodiment of the present invention.
Figure 14:
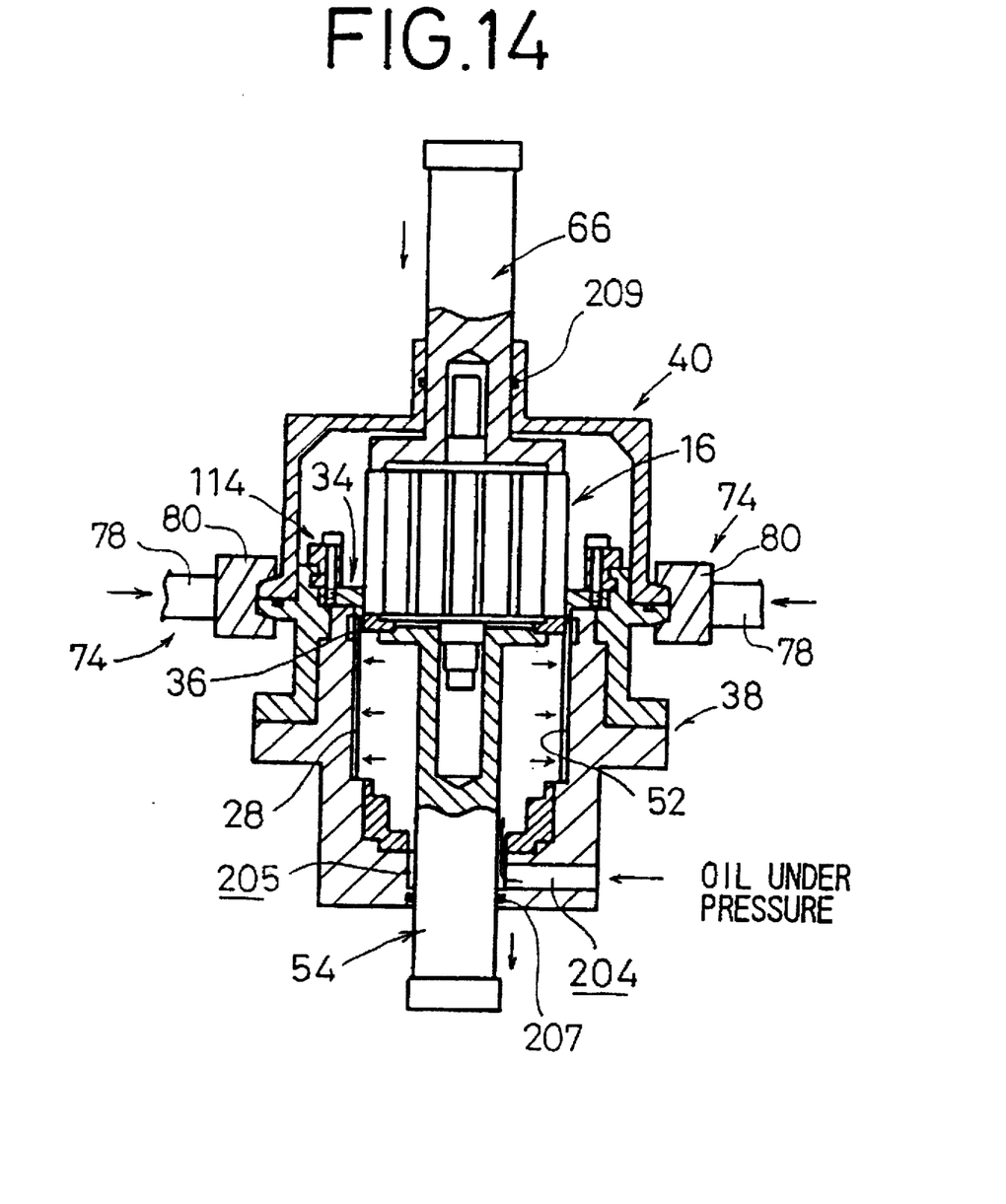
FIG. 14 is a vertical cross-sectional view of the covering apparatus shown in FIG. 13.

FIGS. 13 and 14 show a covering apparatus 200 according to a second embodiment of the present invention. Those parts of the covering apparatus 200 which are identical to those of the covering apparatus 30 according to the first embodiment are denoted by identical reference numerals, and will not be described in detail below.

As shown in FIGS. 13 and 14, the covering apparatus 200 has a fluid supply means 202 for supplying a fluid pressure such as an oil pressure to press the cylindrical member 28 against the inner circumferential surface 52 of the first casing 38 for forcibly spreading the cylindrical member 28 radially outwardly. The fluid supply means 202 has a fluid passage 204 defined in the first casing 38 and/or the second casing 40, a pipe 206 having an end connected to the fluid passage 204 and an opposite end connected through a controller 208 to a hydraulic pump 210. The fluid passage 204 is held in communication with the interior space of the first casing 38 through a hole 205 in which the lower setting member 54 is vertically slidably inserted. An O-ring 207 is disposed around the lower setting member 54 to provide a fluid-tight seal between the lower setting member 54 and the first casing 38. The upper setting member 66 is vertically slidably inserted in the second casing 40 with an O-ring 209 disposed around the upper setting member 66 to provide a fluid-tight seal between the upper setting member 66 and the second casing 44.

To cover the rotor 16 with the cylindrical member 28 using the covering apparatus 200, the holding jig 34 and the movable jig 36 are first placed on the first casing 38, then the permanent magnets 26 of the rotor 16 are located on the respective teeth 124 of the movable jig 36, and the first and second casings 38, 40 are coupled to each other in a fluid-tight manner by the clamp means 74.

Then, as shown in FIG. 14, when oil is supplied under pressure to the fluid passage 204, the oil is introduced through the hole 205 into the cylindrical member 28 in the first casing 38. Therefore, the cylindrical member 28 is pressed against the inner circumferential surface 52 of the first casing 38 under the pressure of the introduced oil, and forcibly expanded or spread radially outwardly by a diameter corresponding to the gap H.

With the cylindrical member 28 expanded radially outwardly, the upper setting member 66 is lowered to cause the flange 72 thereof to press the rotor 16 downwardly. The rotor 16 and the movable jig 36 are lowered together into the cylindrical member 28 which has been expanded radially outwardly. At this time, excessive oil in the first casing 38 is forced through a gap between the rotor 16 and the holding jig 34 into the second casing 40 and/or through the fluid passage 204 to the controller 208.

After the rotor 16 has been inserted into the cylindrical member 28, the oil under pressure in the first casing 38 is returned through the fluid passage 204 back to the hydraulic pump 210. The pressure in the first casing 38 is lowered to the atmospheric pressure, allowing the cylindrical member 28 to be contracted and cover the permanent magnets 26. Then, the clamp means 74 is displaced out of engagement with the first and second casings 38, 40, and the second casing 40 is elevated and the rotor 16 is removed.

In the second embodiment, since the movable jig 36 and the rotor 16 are smoothly inserted together into the cylindrical member 28, it is possible to prevent the inner circumferential surface of the cylindrical member 28 more reliably from being scratched or otherwise damaged due to sliding contact with the movable jig 36.

While the fluid passage 204 has been described as being defined in the first casing 38 in the second embodiment, the fluid passage 204 may be replaced with, or combined with, a fluid passage 204a (indicated by the two-dot-and-dash line in FIG. 13) connected to and defined in the second casing 40.

The covering apparatus according to the present invention and the method carried out thereby offer the following advantages:

When the holding jig and the movable jig are press-fitted into the cylindrical member to forcibly expand or spread the insertion end of the cylindrical member to a diameter greater than the diameter of the rotor, the rotor is guided by the holding jig to be inserted, together with the movable jig, into the cylindrical member. Therefore, the rotor can easily and smoothly be inserted into the cylindrical member which is normally smaller in diameter than the rotor, so that the permanent magnets can reliably be held in intimate contact with the outer circumferential surface of the yoke. Therefore, the rotor can simply and quickly be covered with the cylindrical member in a manner to achieve a high-quality rotor arrangement.

Alternatively, the cylindrical member is forcibly expanded under a fluid pressure while the first and second casings are being coupled in a fluid-tight fashion with the cylindrical member and the rotor accommodated therein. Since the rotor is pressed into the cylindrical member under such a condition, the rotor can easily and smoothly be inserted into the cylindrical member without scratched or otherwise being damaged.

Although certain preferred embodiments of the present invention have been shown and described in detail, it should be understood that various changes and modifications may be made therein without departing from the scope of the appended claims.

What is claimed is:

1. A method of covering permanent magnets of a rotor with a cylindrical member, comprising the steps of:
providing a rotor with opposite ends and having a plurality of permanent magnets thereon which are spaced at given angular intervals around said rotor;
forcing a holding jig having a plurality of grooves of inserting said permanent magnets therein and a plurality of tapered teeth, together with a movable jig, into an insertion end of the cylindrical member, whereby said teeth expand said cylinder member at said insertion end radially outwardly to a diameter greater than a diameter of the rotor, wherein a largest outer diameter of said movable jig is greater than an interior diameter of said cylindrical member when the cylindrical member is in a non-expanded state;
inserting said rotor together with said movable jig into said cylindrical member while being guided by said holding jig, wherein said movable jig further expands the cylindrical member with said rotor having one of said opposite ends continuously engaging and forcing said movable jig during the insertion; and after said rotor has been inserted in said cylindrical member, removing said holding jig and said movable jig from said opposite ends of said rotor, for thereby leaving said permanent magnets covered with said cylindrical member.

2. An apparatus for covering permanent magnets of a rotor, which are angularly spaced at given angular intervals, with a cylindrical member, comprising:

a holding jig for guiding the rotor when said rotor is inserted into said cylindrical member; and a movable jig for being forced with said holding jig into an insertion end of the cylindrical member, said movable jig engaging a leading end of said rotor and being inserted together with said rotor into the cylindrical member;

said holding jig having a plurality of grooves for insertion therein of the permanent magnets and a plurality of first teeth disposed between said grooves for expanding said cylindrical member to a diameter greater than the diameter of the rotor;

said movable jig having a plurality of second teeth for placing thereon said permanent magnets which are inserted in said grooves and expanding said cylindrical member radially outwardly to a diameter greater than the diameter of the rotor, wherein a largest outer diameter of said movable jig is greater than an interior diameter of said cylindrical member when the cylindrical member is in a non-expanded state;

said first and second teeth having respective tapered surfaces progressively smaller in diameter toward a leading end to be inserted into said cylindrical member.

3. An apparatus according to claim 2, wherein said movable jig has a plurality of recesses defined between said second teeth for receiving therein said first teeth of said holding jig to hold said holding jig on the movable jig.

4. An apparatus according to claim 2, further comprising inserting means for inserting said rotor with said movable jig into said cylindrical member.

5. An apparatus according to claims 2, further comprising feed means for feeding said holding jig and said movable jig to said insertion end of the cylindrical member.

* * * * *